(12) United States Patent
Jun et al.

(10) Patent No.: US 10,917,810 B2
(45) Date of Patent: Feb. 9, 2021

(54) METHOD AND WIRELESS COMMUNICATION SYSTEM FOR TRAFFIC MOBILITY BETWEEN HETEROGENEOUS ACCESS NETWORKS

(71) Applicant: ELECTRONICS AND TELECOMMUNICATIONS RESEARCH INSTITUTE, Daejeon (KR)

(72) Inventors: Sun Mi Jun, Daejeon (KR); Jae Ho Kim, Daejeon (KR); No Ik Park, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 135 days.

(21) Appl. No.: 16/111,489

(22) Filed: Aug. 24, 2018

(65) Prior Publication Data

US 2019/0069194 A1    Feb. 28, 2019

(30) Foreign Application Priority Data

Aug. 24, 2017  (KR) .................. 10-2017-0107546
Apr. 9, 2018  (KR) .................. 10-2018-0041223

(51) Int. Cl.
*H04W 28/02*     (2009.01)
*H04W 28/10*     (2009.01)

(52) U.S. Cl.
CPC ....... *H04W 28/0252* (2013.01); *H04W 28/10* (2013.01)

(58) Field of Classification Search
None
See application file for complete search history.

(56) References Cited

U.S. PATENT DOCUMENTS

2009/0154423 A1    6/2009 Song et al.
2013/0308445 A1*  11/2013 Xiang .................. H04W 48/18
                                                370/230

(Continued)

FOREIGN PATENT DOCUMENTS

KR   10-2014-0020684 A   2/2014
KR   10-2014-0136365 A   11/2014

(Continued)

OTHER PUBLICATIONS

3rd Generation Partnership Project; Technical Specification Group Services and System Aspects; Procedures for the 5G System; Stage 2 (Release 15), 3GPP TS 23.502 V0.6.0 (Aug. 2017).

(Continued)

*Primary Examiner* — Saba Tsegaye
(74) *Attorney, Agent, or Firm* — LRK Patent Law Firm

(57) ABSTRACT

A traffic mobility method between heterogeneous access networks of a wireless communication system includes, as a user equipment (UE) multiply accesses a first access network and a second access network, configuring a first transmission path corresponding to the first access network and a second transmission path corresponding to the second access network with respect to the UE, by a gateway, determining whether traffic mobility is performed on each traffic flow based on a traffic mobility policy of the each traffic flow served to the UE through the first transmission path and a transmission state of the second access network, by a control entity, and changing a transmission path of a traffic flow on which traffic mobility is determined, to the second transmission path from the first transmission path, by the gateway.

8 Claims, 8 Drawing Sheets

(56) References Cited

U.S. PATENT DOCUMENTS

| | | |
|---|---|---|
| 2014/0308953 A1 | 10/2014 | Park et al. |
| 2015/0351024 A1 | 12/2015 | Jang et al. |
| 2015/0382269 A1* | 12/2015 | Liang .................. H04W 24/02 |
| | | 370/332 |
| 2016/0029261 A1 | 1/2016 | Jang et al. |
| 2016/0029263 A1 | 1/2016 | Jang et al. |
| 2016/0029264 A1 | 1/2016 | Jang et al. |
| 2016/0044570 A1 | 2/2016 | Jeong et al. |
| 2016/0065478 A1 | 3/2016 | Jeong et al. |
| 2017/0048739 A1 | 2/2017 | Jeong et al. |
| 2017/0085494 A1 | 3/2017 | Park et al. |
| 2017/0111822 A1 | 4/2017 | Jung et al. |
| 2018/0199398 A1* | 7/2018 | Dao .................. H04W 36/0022 |
| 2018/0279180 A1* | 9/2018 | Lee .................. H04W 36/0011 |
| 2019/0014529 A1* | 1/2019 | Karampatsis ....... H04W 40/248 |
| 2020/0107385 A1* | 4/2020 | Adjakple ............. H04W 76/15 |

FOREIGN PATENT DOCUMENTS

| | | |
|---|---|---|
| KR | 10-2015-0016179 A | 2/2015 |
| KR | 10-1549328 B1 | 9/2015 |
| KR | 10-2015-0114917 A | 10/2015 |
| KR | 10-2015-0123747 A | 11/2015 |
| KR | 10-2017-0034314 A | 3/2017 |

OTHER PUBLICATIONS

John Cartmell, "LTE Converged Gateway IP Flow Mobility Solution", 7th IASTED International Conference on Communication. 2012.

* cited by examiner

METHOD AND WIRELESS COMMUNICATION SYSTEM FOR TRAFFIC MOBILITY BETWEEN HETEROGENEOUS ACCESS NETWORKS

CROSS-REFERENCE TO RELATED APPLICATIONS

This application claims priority to and the benefit of Korean Patent Application Nos. 10-2017-0107546 and 10-2018-0041223, filed in the Korean Intellectual Property Office on Aug. 24, 2017 and Apr. 9, 2018, respectively, the entire contents of which are incorporated herein by reference.

BACKGROUND OF THE INVENTION

1. Field of the Invention

An exemplary embodiment of the present invention relates to a method and wireless communication system for traffic mobility between heterogeneous access networks.

2. Description of Related Art

With a $5^{th}$ generation (5G) network environment ahead, currently, various wireless network environments such as 3GPP-based 4G LTE or 802.11-based WiFi coexist as a mobile wireless network environment.

Accordingly, there has been an increasing need to provide an optimum service in a 5G network due to coexistence of various wireless network environments. Particularly, when a user intends to simultaneously access different radio access networks (RANs) to transmit and receive traffic, there has been a need for support technologies for selecting a wireless access network appropriate for traffic characteristics to move and transfer traffic. A traffic mobility technology is capable of supporting a user to receive a more economical data transmission service and supporting increase in transmission capacity usable by the user.

In current 4G mobile communication, to support traffic mobility in a multi-access environment of LTE and WiFi, a data offloading technology using an access network discovery and selection function (ANDSF) is disclosed.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method and wireless communication system having advantages of supporting traffic mobility between access networks when a user equipment (UE) simultaneously accesses a plurality of access networks to transmit and receive traffic in an environment in which heterogeneous wired and wireless access networks coexist. According to an embodiment of the present invention, a method of traffic mobility between heterogeneous access networks of a wireless communication system includes, as a user equipment (UE) multiply accesses a first access network and a second access network, configuring a first transmission path corresponding to the first access network and a second transmission path corresponding to the second access network with respect to the UE, by a gateway, determining whether traffic mobility is performed on each traffic flow based on a traffic mobility policy of the each traffic flow served to the UE through the first transmission path and a transmission state of the second access network, by a control entity, and changing a transmission path of a traffic flow on which traffic mobility is determined, to the second transmission path from the first transmission path, by the gateway.

The first access network and the second access network may use different wired and wireless access technologies.

The configuring may include, as the UE accesses the first access network, configuring the first transmission path of the UE, a first base station that manages the first access network, and the gateway, by the gateway, and as the UE accesses the second access network, configuring the second transmission path of the UE, a second base station that manages the second access network, and the gateway.

In the traffic mobility method according to the exemplary embodiment, the traffic mobility policy may include access network preference of the each traffic flow, and the determining may include determining traffic mobility on a traffic flow with higher preference with respect to the second access network than the first access network.

In the traffic mobility method according to the exemplary embodiment, the traffic mobility policy may include whether quality of service (QoS) of the each traffic flow is guaranteed, and the determining may include determining whether traffic mobility is performed, based on a total amount of traffic of the second access network with respect to a traffic flow that requires QoS guaranty.

The traffic mobility method according to the exemplary embodiment may further include receiving information indicating a load state of the second access network, measured by a base station of the second access network, from the base station of the second access network, and acquiring a transmission state of the second access network based on the information indicating the load state of the second access network.

The traffic mobility method according to the exemplary embodiment may further include, when a transmission path of a traffic flow is changed to the second transmission path from the first transmission path, transmitting a message for a request of a dynamic change of a routing policy with respect to a traffic flow to the UE, by the control entity.

The traffic mobility method according to the exemplary embodiment may further include, receiving a response message including information indicating whether a change in the routing policy of the UE is successful/fails from the UE, by the control entity.

The traffic mobility may include switching of an access network and moving a currently served traffic flow to the access network or dynamic selection of the access network and initiation of a service when the service is initiated.

The traffic mobility may include separate mobility or group mobility of an IP flow.

The traffic mobility method according to the exemplary embodiment may further include, transmitting a message for reporting a load state of the first access network and the second access network to the control entity, by the gateway, determining whether traffic mobility is performed on each traffic flow served to the UE based on a load state of the first access network and the second access network, by the control entity, and changing a transmission path of the each traffic flow served to the UE according to determination of the control entity, by the gateway.

When the wireless communication system is a $5^{th}$ generation (5G) system, the gateway may include a user plane function (UPF) and the control entity may include an access & mobility management function (AMF) and session management function (SMF).

According to another embodiment of the present invention, a method of traffic mobility between heterogeneous access networks of a wireless communication system includes, as a user equipment (UE) that accesses a first access network attempts multi-access to a second access network, determining whether a preconfigured first Internet protocol flow mobility (IFOM) and routing rule needs to be updated, based on a load state of a data network, upon determining that the first IFOM and the routing rule needs to be updated, changing the first IFOM and routing rule to a second IFOM and routing rule, performing a change procedure of a traffic transmission path on the UE, based on the second IFOM and routing rule, and transmitting and receiving a traffic flow with the UE, based on the second IFOM and routing rule.

The traffic mobility method according to the another exemplary embodiment may further include, receiving a PDU session establishment request message of a multi-access PDU session shared by the first and second access networks from the UE, performing an authentication/authorization on the multi-access PDU session, and when the multi-access PDU session is completely authorized, transmitting a response to the PDU session establishment request message, to the UE, wherein the response may include the second IFOM and routing rule.

In the traffic mobility method according to the another exemplary embodiment, upon receiving the second IFOM and routing rule, the UE may configure currently served traffic flows or traffic flows to be served later according to the second IFOM and routing rule.

The traffic mobility method according to the another exemplary embodiment may include determining whether the second IFOM and routing rule needs to be updated, based on at least one of an access state of the UE with respect to the first and second access networks, a load state of the first and second access networks, and whether quality of service (QoS) of each traffic flow is guaranteed, when the second IFOM and routing rule needs to be updated, generating a third IFOM and routing rule, performing a change procedure of a traffic transmission path on the UE, based on the third IFOM and routing rule, and transmitting and receiving a traffic flow with the UE, based on the third IFOM and routing rule.

The traffic mobility method according to the another exemplary embodiment may further include transmitting a PDU session modification command including the third IFOM and routing rule to the UE, wherein, upon receiving the third IFOM and routing rule, the UE may configure an uplink path of currently served traffic flows or traffic flows to be served later according to the third IFOM and routing rule.

The traffic mobility method according to the another exemplary embodiment may further include, as the UE makes a request for access release from the second access network, performing a PDU session release procedure to change the first IFOM and routing rule to a fourth IFOM and routing rule, and transmitting and receiving a traffic flow with the UE based on the fourth IFOM and routing rule.

The traffic mobility method according to the another exemplary embodiment may include transmitting a PDU session release command message including the fourth IFOM and routing rule to the UE, wherein, upon receiving the fourth IFOM and routing rule, the UE may configure an uplink path of currently served traffic flows or traffic flows to be served later according to the fourth IFOM and routing rule.

In the traffic mobility method according to another exemplary embodiment, the determining and the changing may be performed by a session management function (SMF).

DETAILED DESCRIPTION OF THE EMBODIMENTS

Figure 1:
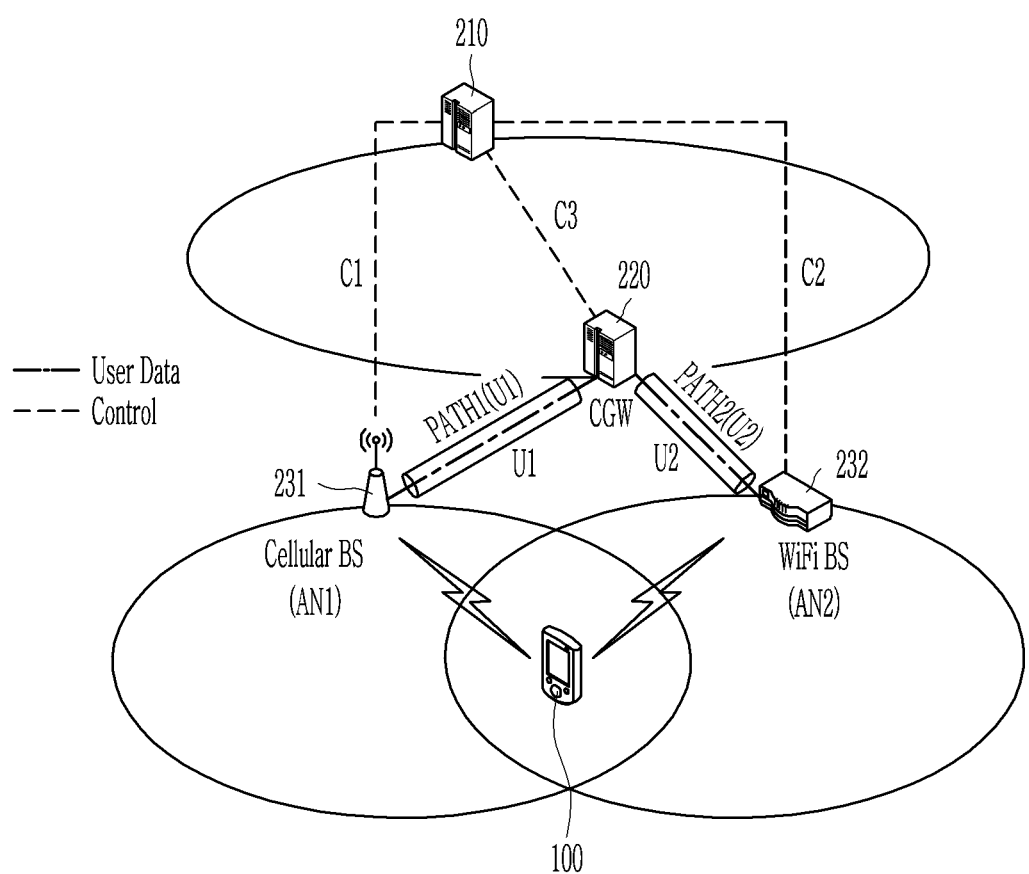
FIG. 1 is a schematic diagram of a service network of a wireless communication system according to an exemplary embodiment.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification and claims, unless explicitly described to the contrary, the word "comprise" and variations such as "comprises" or "comprising", will be understood to imply the inclusion of stated elements but not the exclusion of any other elements.

Throughout the specification, a terminal may refer to a mobile terminal (MT), a mobile station (MS), an advanced mobile station (AMS), a high reliability mobile station (HR-MS), a subscriber station (SS), a portable subscriber station (PSS), an access terminal (AT), a user equipment (UE), etc. and may also include all or some of functions of the MT, the MS, the AMS, the HR-MS, the SS, the PSS, the AT, the UE, etc.

A base station (BS) may refer to an advanced base station (ABS), a high reliability base station (HR-BS), a node B, an evolved node B (eNodeB), an access point (AP), a radio access station (RAS), a base transceiver station (BTS), a mobile multihop relay (MMR)-BS, a relay station (RS) that functions as a base station, a relay node (RN) that functions as a base station, an advanced relay station (ARS) that functions as a base station, a high reliability relay station (HR-RS) that functions as a base station, a small base station [femto BS, a home node B (HNB), a home eNodeB (HeNB), a pico BS, a metro BS, a micro BS, etc.], etc. and may also include all or some of functions of the ABS, the nodeB, the eNodeB, the AP, the RAS, the BTS, the MMR-BS, the RS, the RN, the ARS, the HR-RS, the small base station, etc.

Throughout the specification, a transceiver may refer to a terminal, a mobile terminal (MT), a mobile station (MS), an advanced mobile station (AMS), a high reliability mobile station (HR-MS), a subscriber station (SS), a portable subscriber station (PSS), an access terminal (AT), a user equipment (UE), etc. and may also include all or some of functions of the terminal, the MT, the AMS, the HR-MS, the SS, the PSS, the AT, the UE, etc.

Throughout the specification, a transceiver may refer to a base station (BS), an advanced base station (ABS), a high reliability base station (HR-BS), a node B, an evolved node B (eNodeB), an access point (AP), a radio access station (RAS), a base transceiver station (BTS), a mobile multihop relay (MMR)-BS, a relay station (RS) that functions as a base station, a high reliability relay station (HR-RS) that functions as a base station, etc. and may also include all or some of functions of the ABS, the nodeB, the eNodeB, the AP, the RAS, the BTS, the MMR-BS, the RS, the HR-RS, etc.

Hereinafter, a method and wireless communication system for traffic mobility between heterogeneous access networks according to exemplary embodiments of the present invention are described in detail with reference to required drawings.

In the specification, a traffic mobility technology is referred to as traffic steering, traffic switching, traffic splitting, or the like and is classified according to internal characteristics thereof. Traffic steering is performed by dynamically selecting an access network based on corresponding traffic when a new traffic service is initiated. Traffic switching is performed by switching an access network while ensuring service permanence based on currently served traffic. According to traffic splitting, service permanence of currently served traffic is ensured and a single access network is expanded to a multi-access network to transmit traffic to a multipath.

In the specification, traffic mobility may include separate mobility and group mobility of an IP flow.

FIG. 1 is a schematic diagram of a service network of a wireless communication system according to an exemplary embodiment and illustrates a service network configured by integrating and accommodating a cellular mobile access network and a wireless local area network (WLAN) access network in an environment the cellular mobile access network and the WLAN access network coexist.

In the wireless communication system according to an exemplary embodiment, an edge unified control entity (eUCE) 210 may perform authentication of a user equipment (UE) 100, an access procedure, a path configuration of traffic, and a signal procedure for traffic mobility management. For mobility of user traffic and distribution and transmission of user traffic in a multi-access network environment, the eUCE 210 may recognize a state of each access network and may configure and change a traffic transmission path.

A convergence gateway (CGW) 220 may be connected to at least one BS to transmit and receive user traffic of the UE 100. As shown in FIG. 1, in an environment in which heterogeneous wireless access networks coexist, the CGW 220 may be connected to BSs of different access networks, respectively.

As exemplified in FIG. 1, the CGW 220 may be connected to a cellular BS 231, for managing an LTE-based mobile access network AN1, through an interface U1 and may be connected to a WiFi BS 232, for managing a WiFi-based wireless local area network (WLAN) access network AN2, through an interface U2.

The CGW 220 may be connected to the eUCE 210 through an interface C3 and may transmit and receive a traffic path control message to and from the eUCE 210 through the interface C3. The CGW 220 may configure a path for user traffic transmission and reception of the UE 100 over an interface with each BS, based on the traffic path control message received through the eUCE 210.

As exemplified in FIG. 1, the CGW 220 may configure a traffic transmission path PATH1 of the UE 100 over the interface U1 connected to the cellular BS 231 and may configure a traffic transmission path PATH2 of the UE 100 over the interface U2 connected to the WiFi BS 232.

The CGW 220 configured with the above structure may integrate and accommodate BSs that manage heterogeneous wireless access networks to transmit and receive user traffic in an environment in which the heterogeneous wireless access networks coexist.

The UE 100 may include one or more medium access control (MAC) for supporting different wireless access technology and may access at least one access network.

As exemplified in FIG. 1, the UE 100 may access the mobile access network AN1 for managing the cellular BS 231. In this case, the UE 100 may access the eUCE 210 through wireless link and an interface C1 of the mobile access network AN1 and, during a procedure of configuring a session for traffic transmission with the UE 100, the eUCE 210 may order the CGW 220 to configure the traffic transmission path PATH1 of the CGW 220-the mobile access network AN1-the UE 100. The UE 100 may multiply access the wireless local area network (WLAN) access network AN2 managed by the WiFi BS 232 in a state in which the UE 100 accesses the mobile access network AN1. In this case, the UE 100 may access the eUCE 210 through a wireless link of the wireless local area network (WLAN) access network AN2 and an interface C2 and, during a procedure of configuring a session for traffic transmission with the UE 100, the eUCE 210 may order the CGW 220 to configure the traffic transmission path PATH2 of the CGW 220-the wireless local area network (WLAN) access network AN2-the UE 100.

As described above, in the wireless communication system according to an exemplary embodiment, the single eUCE 210 and the single CGW 220 may integrate, accommodate, and manage heterogeneous access networks. Accordingly, as shown in FIG. 1, when the UE 100 multiply accesses the heterogeneous access networks AN1 and AN2, the UE 100 may move and transfer user traffic of the UE 100 according to a state of each of the access networks AN1 and AN2 and the characteristics of each traffic flow to provide an optimum traffic service to a user.

Although FIG. 1 illustrates an example in which a service network of a wireless communication system is configured by integrating and accommodating an LTE-based mobile access network and a WiFi-based wireless local area network (WLAN) access network, the present invention is not limited thereto. According to another exemplary embodiment, the service network of the wireless communication system may be modified to a structure configured by integrating and accommodating various access networks such as an access network based on a new 5G wireless transmission technology, e.g., mmWave, LTE-advanced, licensed assisted access (LAA), LTEIWi-Fi aggregation (LWA), or low latency Internet of Thing (IoT) and a cellular based access network, e.g., WiMax or WiBro.

Figure 2:
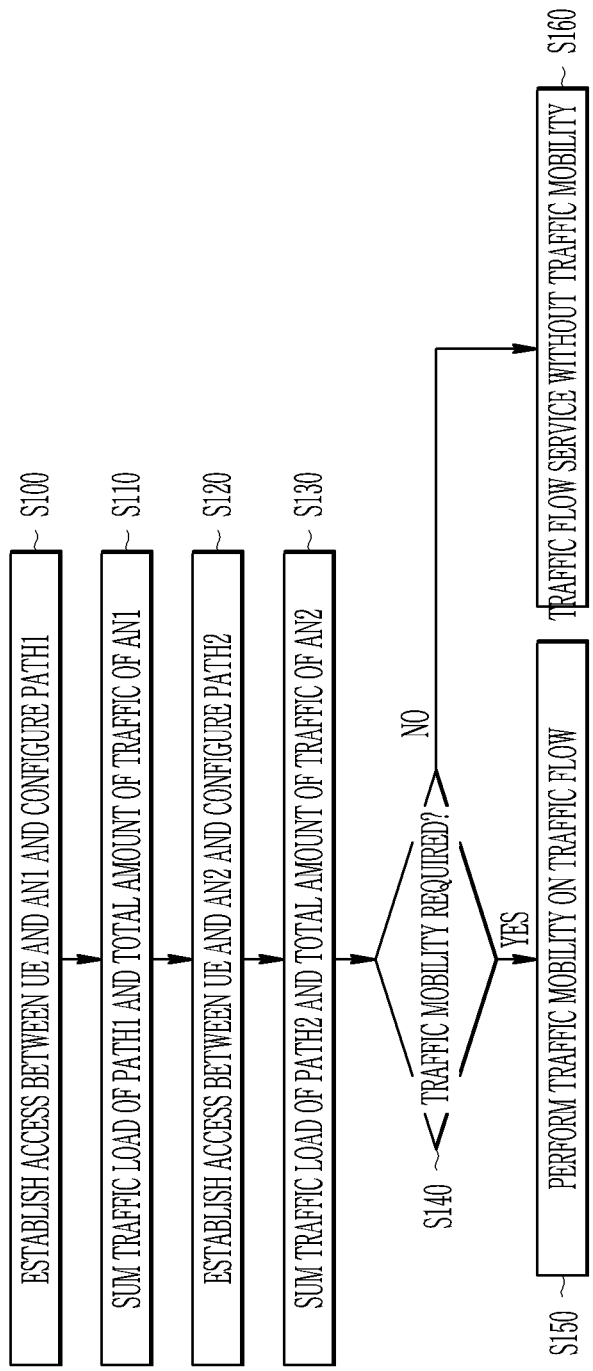
FIG. 2 is a schematic diagram of traffic mobility method between heterogeneous access networks in a wireless communication system according to an exemplary embodiment.

FIG. 2 is a schematic diagram of traffic mobility method between heterogeneous access networks in a wireless communication system according to an exemplary embodiment.

Referring to FIG. 2, in the wireless communication system according to an exemplary embodiment, as the UE 100 attempts access to the mobile access network AN1, the eUCE 210 may establish and initiate connection between the UE 100 and the mobile access network AN1. During a procedure of configuring a session for traffic transmission with the UE 100, the eUCE 210 may control the CGW 220 to configure the traffic transmission path PATH1 of the UE 100-the mobile access network AN1-the CGW 220 (S100).

As the traffic transmission path PATH1 of the UE 100-the mobile access network AN1-the CGW 220 is newly configured through operation S100, the eUCE 210 may sum added traffic load of the traffic transmission path PATH1 and a total amount of traffic served in the mobile access network AN1 (S110).

Then, as the UE 100 attempts access to the WiFi-based wireless local area network (WLAN) access network AN2, the eUCE 210 may establish and initiate connection between the UE 100 and the wireless local area network (WLAN) access network AN2. During a procedure of configuring a session for traffic transmission with the UE 100, the eUCE 210 may control the CGW 220 to configure the traffic transmission path PATH2 of the UE 100-the wireless local area network (WLAN) access network AN2-the CGW 220 (S120).

As the traffic transmission path PATH2 of the UE 100-the wireless local area network (WLAN) access network AN2-the CGW 220 is newly configured through operation S120, the eUCE 210 may sum added traffic load of the traffic transmission path PATH2 and a total amount of traffic served in the wireless local area network (WLAN) access network AN2 (S130).

As the UE 100 multiply accesses the wireless local area network (WLAN) access network AN2 in a state in which the UE 100 accesses the mobile access network AN1, the eUCE 210 may determine whether traffic mobility is required with respect to each traffic flow served through the mobile access network AN1 based on a mobility policy of each traffic flow served for the UE 100 and a transmission state of each of the access networks AN1 and AN2 that the UE 100 accesses (S140).

A traffic mobility policy of each traffic flow indicates a traffic mobility rule of the case in which the UE 100 multiply accesses a plurality of access networks.

Table 1 below shows an example of a mobility policy of a separate traffic flow.

TABLE 1

Example of mobility policy of traffic flow
Mobility policy of traffic flow

1) CN address: IP address + port number
2) UE address: IP address + port number
3) Maximum Bit Rate or Guaranteed Bit Rate (QoS)
4) Access network preference: WiFi > Fixed > LTE
5) QoS_Guaranteed_Flag: True or False A traffic mobility policy corresponding to each traffic flow may be owned by the eUCE 210 or may be owned by the UE 100 and may be transferred to the eUCE 210.

In Table 1 above, a correspondent node (CN) corresponds to a server in terms of the UE 100 and the CN address indicates an address of the server. The UE address may be an address of the UE 100, the same address may be shared in all access networks that the UE 100 accesses, and different addresses may be assigned depending on access networks that the UE 100 accesses.

The quality of service (QoS) is a bit rate to be guaranteed when a corresponding traffic flow is transmitted and may be configured as a maximum bit rate or a guaranteed bit rate.

The access network preference indicates priority of access networks to be selected during traffic mobility in a multi-access environment. For example, as shown in Table 1 above, according to a traffic flow configured with the highest priority for WiFi, the UE 100 may perform traffic mobility to a wireless local area network (WLAN) access network from a LTE-based mobile access network when the UE 100 accesses a WiFi-based wireless local area network (MILAN) access network in a state in which the UE 100 accesses the LTE-based mobile access network.

The QoS guaranteed flag is a flag indicating whether a corresponding traffic flow requires QoS guaranty and may be configured to be true or false. According to a traffic flow configured with the QoS guaranteed flag to be true, traffic mobility may be performed only when QoS of the corresponding traffic flow is guaranteed by a transmission state of an access network to which traffic is to be moved. On the other hand, according to a traffic flow configured with the QoS guaranteed flag to be false, traffic mobility may be performed irrespective of a transmission state of an access network to which traffic is to be moved.

In operation S140, the eUCE 210 may analyze a mobility policy of each traffic flow and, when access network priority of the access network AN2 to which a traffic flow is to be transmitted is higher than the other access network AN1 that the UE 100 accesses, the eUCE 210 may determine traffic mobility of the corresponding traffic flow.

In operation S140, when a traffic flow to be moved is a traffic flow that requires QoS guaranty, the eUCE 210 may determine traffic mobility of the corresponding traffic flow only when QoS of the corresponding traffic flow is guaranteed by a transmission state of the access network AN2 to which the corresponding traffic flow is to be moved. The eUCE 210 may determine whether QoS of a corresponding traffic flow is guaranteed based on a transmission state of the access network AN2 to which a traffic flow is to be moved, that is, a total amount of traffic. For example, when a total amount of traffic of the wireless local area network (WLAN) access network AN2 to which a traffic flow is to be moved is equal to or less than a threshold value, the eUCE 210 may determine a state of the wireless local area network (WLAN) access network AN2 to be a state in which QoS of the traffic flow to be moved is guaranteed. For example, when the total amount of traffic of the wireless local area network (WLAN) access network AN2 to which a traffic flow is to be moved is greater than the threshold value, the eUCE 210 may determine a state of the wireless local area network (WLAN) access network AN2 to be a state in which it is difficult to guarantee the QoS of a traffic flow to be moved.

In operation S140, the eUCE 210 may determine traffic mobility of a traffic flow based on load metric information of the access network AN2 to which traffic is to be moved.

The eUCE 210 may periodically receive load metric information from a base station that belongs to each access network.

Table 2 below illustrates an example of load metric information and illustrates load metric information received from WiFi BS 232.

TABLE 2

Example of load metric information
Load Metric

1) The number of UEs connected to BS (or AP)
2) Retransmission bit rate
3) Channel utilization
4) Frame drop rate in Tx queue
5) Contention delay in queue and channel
6) Throughput or Bandwidth, average load
7) Average load Referring to Table 2 above, load metric information may indicate a load degree of a corresponding access network and may include at least one parameter acquired by a corresponding base station (BS). The load metric information may include the number of UEs connected to the BS (or an access point (AP)), a retransmission bit rate, channel utilization, a frame drop rate in an Rx queue, contention delay in queue and channel, a bit rate or a bandwidth, average load, and so on.

When a BS that generates the load metric information is the WiFi BS 232, the number of UEs connected to the BS (or an access point (AP)) indicates the number of UEs that currently access the WiFi BS 232 and the retransmission bit rate and channel utilization indicate traffic retransmission bit rate and channel utilization between the WiFi BS 232 and UEs connected thereto, respectively. The frame drop rate in an Tx queue indicates a frame drop rate of an Rx queue of the WiFi BS 232 and the contention delay in queue and channel indicates a contention delay degree in an Rx or Tx queue of the WiFi BS 232 and a contention delay degree in a channel between the WiFi BS 232 and UEs connected thereto. The bit rate or bandwidth indicates a bit rate or channel bandwidth between the WiFi BS 232 and UEs connected thereto and the average load indicates an average load amount in the WiFi BS 232.

Based on the load metric information of the access network AN2 to which traffic is to be moved, the eUCE 210 may acquire information on a transmission state of the corresponding access network AN2 and may determine traffic mobility based on the transmission state.

The eUCE 210 may control the CGW 220 to perform traffic mobility to the PATH2 from the PATH1 with respect to a traffic flow determined to require traffic mobility through operation S140 (S150). Here, traffic mobility may be performed using a method such as flow mobility, traffic steering, traffic switching, or traffic splitting.

On the other hand, with respect to a traffic flow that is not permitted to be moved through operation S140, the eUCE 210 may control the corresponding traffic flow to be served without traffic mobility (S160).

Figure 3:
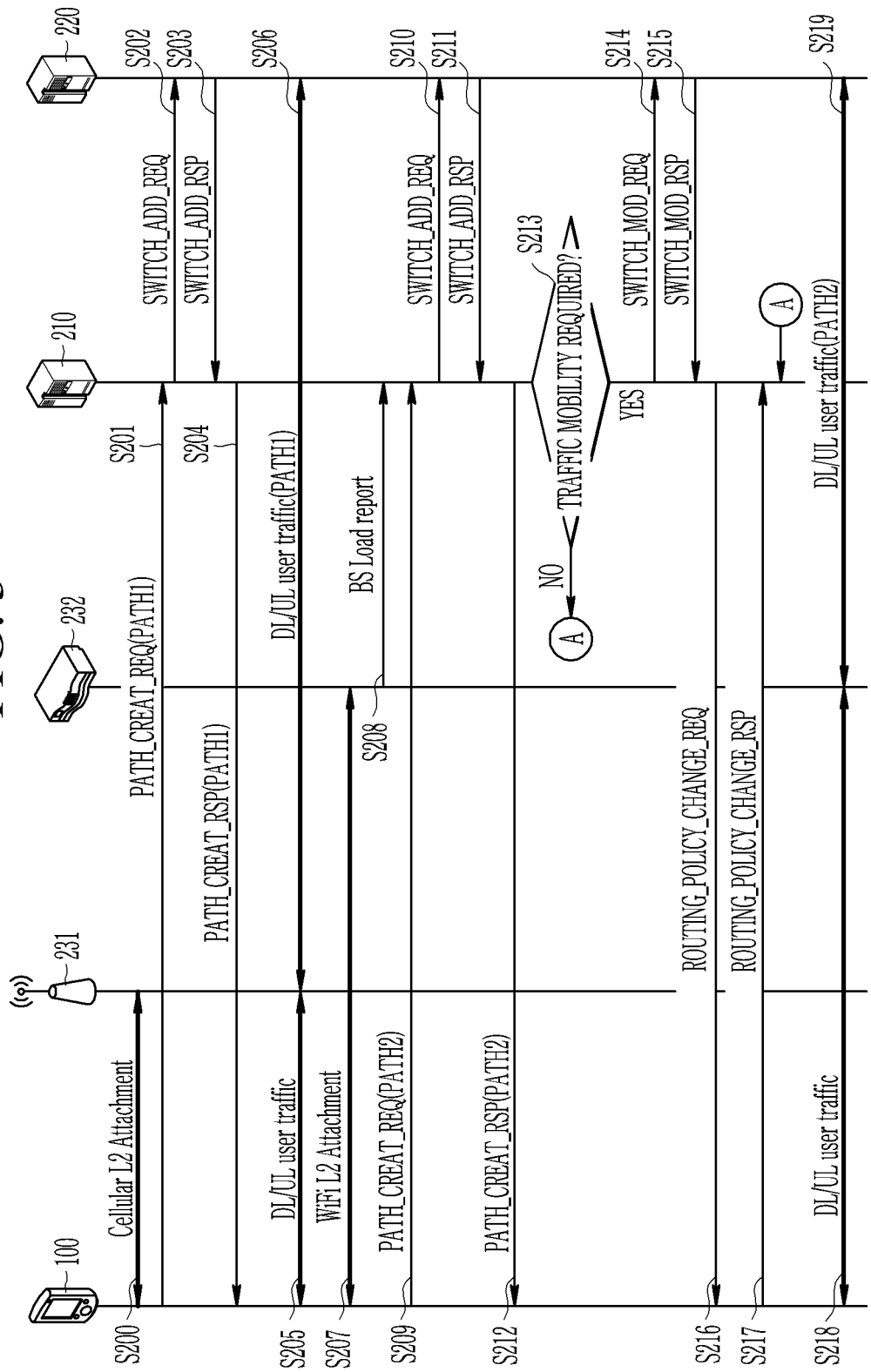
FIG. 3 illustrates an example of a signaling procedure for traffic mobility in a wireless communication system according to an exemplary embodiment.

FIG. 3 illustrates an example of a signaling procedure for traffic mobility in a wireless communication system according to an exemplary embodiment and illustrates the case in which traffic mobility is subsequently performed in a state in which a UE newly accesses the wireless local area network (WLAN) access network AN2 in a state in which the UE accesses the mobile access network AN1 in the service network illustrated in FIG. 1.

Referring to FIG. 3, in the wireless communication system according to an exemplary embodiment, as the UE 100 accesses the cellular BS 231 to access the mobile access network AN1 (S200), the UE 100 may transmit a message PATH_CREAT_REQ(PATH1) for a request of a traffic path configuration to the eUCE 210 (S201).

The eUCE 210 that receives the message may transmit a control message SWITCH_ADD_REQ for a request of configuration of the traffic transmission path PATH1 of the UE 100-the mobile access network AN1-the CGW 220 to the CGW 220 (S202). Accordingly, the CGW 220 may configure the traffic transmission path PATH1 of the UE 100-the mobile access network AN1-the CGW 220 and may transmit a response message SWITCH_ADD_RSP indicating that the traffic transmission path PATH1 is completely configured, to the eUCE 210 (S203).

As the traffic transmission path PATH1 of the UE 100-the mobile access network AN1-the CGW 220 is completely configured by the CGW 220, the eUCE 210 may transmit a response message PATH_CREAT_RSP(PATH1) including information on a newly configured traffic transmission path PATH1 to the UE 100 to transmit or receive user traffic of the UE 100 through the newly configured traffic transmission path PATH1 (S204).

Then, DL/UL user traffic of the UE 100 may be transmitted or received through the traffic transmission path PATH1 of the UE 100-the mobile access network ANI -the CGW 220 (S205 and S206).

As the UE 100 accesses the WiFi BS 232 to multiply access the wireless local area network (WLAN) access network AN2 in a state in which the UE 100 accesses the mobile access network AN1 (S207), the UE 100 may transmit a message PATH_CREAT_REQ(PATH2) for a request of a traffic path configuration to the eUCE 210 (S209).

The eUCE 210 that receives the message may transmit the control message SWITCH_ADD_REQ for a request of a configuration of the traffic transmission path PATH2 of the UE 100-the wireless local area network (WLAN) access network AN2-the CGW 220 to the CGW 220 (S210). Accordingly, the CGW 220 may configure the traffic transmission path PATH2 of the UE 100-the wireless local area network (WLAN) access network AN2-the CGW 220 and may transmit the response message SWITCH_ADD_RSP indicating that the traffic transmission path PATH2 is completely configured to the eUCE 210 (S211).

As the traffic transmission path PATH2 of the UE 100-the wireless local area network (MILAN) access network AN2-the CGW 220 is completely configured by the CGW 220, the eUCE 210 may transmit a response message PATH_CREAT_RSP(PATH2) including information on a newly configured traffic transmission path PATH2 to the WiFi UE 100 to transmit or receive user traffic of the UE 100 through the newly configured traffic transmission path PATH2 (S212).

Although FIG. 3 illustrates an example in which operation S212 of transmitting the message PATH_CREAT_RSP (PATH2) by the eUCE 210 is performed prior to operation S213 of determining whether mobility of traffic flow is required, the present invention is not limited thereto and, thus, the eUCE 210 may determine that mobility of traffic flow is required (S213) and, according to the determination result, the eUCE 210 may selectively perform traffic mobility (S214 and S215) and, then, may transmit the message PATH_CREAT_RSP (PATH2) to the UE 100. In this case, the eUCE 210 may transmit the response message PATH_CREAT_RSP(PATH2) including information on the newly configured traffic transmission path PATH2 to the UE 100 irrespective of the determination result of traffic mobility in operation S213.

As the traffic transmission path PATH2 of the UE 100-the wireless local area network (WLAN) access network AN2-the CGW 220 is completely configured by the CGW 220, the eUCE 210 may determine whether traffic mobility of traffic flows served to the UE 100 through the exiting traffic transmission path PATH1 is required (S213).

In operation S213, the eUCE 210 may determine whether traffic mobility of each traffic flow served through the mobile access network AN1 is required, based on a mobility policy of each traffic flow served to the UE 100 and a transmission state of each of the access networks AN1 and AN2 that the UE 100 currently accesses.

For example, the eUCE 210 may analyze a mobility policy of each traffic flow and, when access network priority of the access network AN2 to which traffic is to be transmitted is higher than the other access network AN1 that the UE 100 accesses, the eUCE 210 may determine traffic mobility of the corresponding traffic flow.

For example, when a traffic flow to be moved is a traffic flow that requires QoS guaranty, the eUCE 210 may determine traffic mobility of the corresponding traffic flow only when QoS of the corresponding traffic flow is guaranteed by a transmission state of the access network AN2 to which the corresponding traffic flow is to be moved. The eUCE 210 may determine whether QoS of a corresponding traffic flow is guaranteed based on a transmission state of the access network AN2 to which a traffic flow is to be moved, that is, a total amount of traffic. When a total amount of traffic of the wireless local area network (WLAN) access network AN2 to which a traffic flow is to be moved is equal to or less than a threshold value, the eUCE 210 may determine a state of the wireless local area network (WLAN) access network AN2 to be a state in which QoS of the traffic flow to be moved is guaranteed. When the total amount of traffic of the wireless local area network (WLAN) access network AN2 to which a traffic flow is to be moved is greater than the threshold value, the eUCE 210 may determine a state of the wireless local area network (WLAN) access network AN2 to be a state in which it is difficult to guarantee the QoS of a traffic flow to be moved.

In operation S213, the eUCE 210 may determine traffic mobility of a traffic flow based on load metric information of the wireless local area network (WLAN) access network AN2 to which traffic is to be moved. Here, the load metric information indicates a load degree of the wireless local area network (WLAN) access network AN2, measured by the WiFi BS 232, and the eUCE 210 may periodically receive a message, i.e., BS load report including the load metric information of the wireless local area network (WLAN) access network AN2 from the WiFi BS 232 (S208) to acquire the load metric information of the wireless local area network (WLAN) access network AN2. Based on the load metric information of the wireless local area network (WLAN) access network AN2 to which a traffic flow is to be moved, the eUCE 210 may estimate a transmission state of the wireless local area network (WLAN) access network AN2 and may determine traffic mobility based on the transmission state.

Upon determining that traffic mobility to PATH2 from PATH1 is required through operation S213, the eUCE 210 may transmit a control message SWITCH_MOD_REQ for a request of traffic mobility with respect to a traffic flow to be determined that requires traffic mobility, to the CGW 220 (S214). Accordingly, the CGW 220 may change a transmission path of the corresponding traffic flow to PATH2 from PATH1 and may transmit a response message SWITCH_MOD_RSP corresponding thereto, to the eUCE 210 (S215).

Generally, the UE 100 may select an access network and may configure a traffic path according to a policy predetermined with a network when a traffic flow service is initiated. However, according to an exemplary embodiment of the present invention, as described above, the eUCE 210 may determine whether traffic mobility is required through operation S213 and may perform a procedure of changing a transmission path of an already served traffic flow according to the determination result (S214 and S215).

When a transmission path of a currently served traffic flow is changed through operations S213 to S215, the eUCE 210 may additionally transmit a message ROUTING_POLICY_CHANGE_REQ for a request of a dynamic change in a routing policy of the traffic flow to the UE 100 in response to the change (S216).

The UE 100 that receives the message ROUTING_POLICY_CHANGE_REQ through operation S216 may dynamically change a routing policy with respect to a currently served traffic flow through an upward path configuration of the currently served traffic flow. The UE 100 may also select access network paths (e.g., PATH1 or PATH2) according to the changed routing policy with respect to a traffic flow that is not currently served to the UE 100 when the service with respect to the corresponding traffic flow is initiated later.

The UE 100 may transmit a message ROUTING_POLICY_CHANGE_RSP to the eUCE 210 in response to the message ROUTING_POLICY_CHANGE_REQ to the eUCE 210 (S217). The message ROUTING_POLICY_CHANGE_RSP may be selectively transmitted by the UE 100 and may include information about whether a change in a routing policy with respect to a traffic flow of the UE 100 is successful/fails.

When a transmission path is determined as any one of PATH1 and PATH2 with respect to separate traffic flows configuring user traffic of the UE 100 through operations S213 to S215, traffic flows that are determined to be moved among separate traffic flows configuring user traffic of the UE 100 may be transmitted or received through the traffic transmission path PATH2 of the UE 100-the wireless local area network (WLAN) access network AN2-the CGW 220 (S218 and S219).

Figure 4:
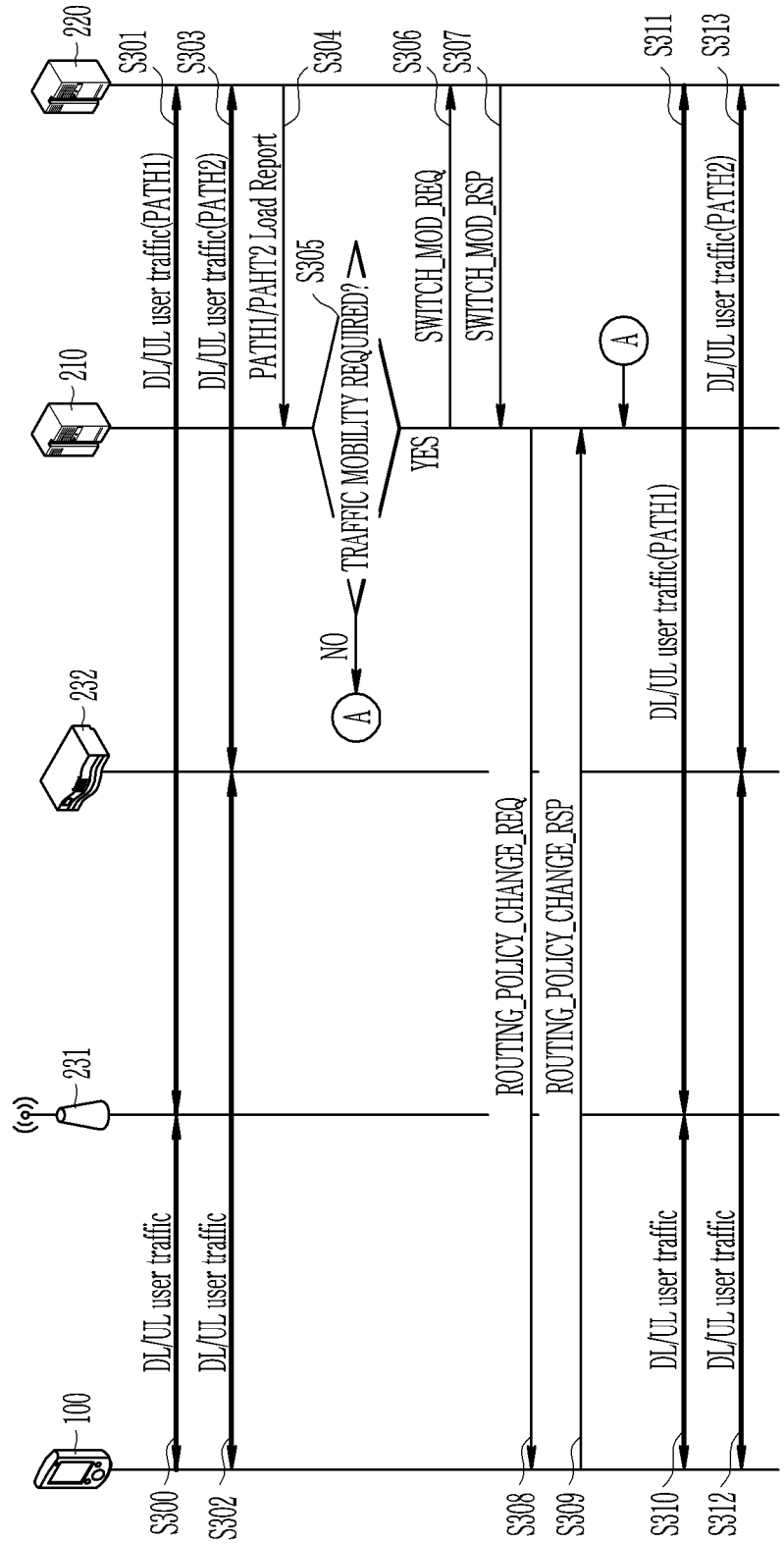
FIG. 4 illustrates another example of a signaling procedure for traffic mobility in a wireless communication system according to an exemplary embodiment.

FIG. 4 illustrates another example of a signaling procedure for traffic mobility in a wireless communication system according to an exemplary embodiment and illustrates the case in which a signaling procedure for traffic mobility is dynamically performed when a traffic service is continuously performed in a state in which a UE multiply accesses the mobile access network AN1 and the wireless local area network (WLAN) access network AN2 in the service network illustrated in FIG. 1.

Referring to FIG. 4, in the wireless communication system according to an exemplary embodiment, in a state in which the UE 100 multiply accesses the mobile access network AN1 and the wireless local area network (WLAN) access network AN2, downlink/uplink (DL/UL) user traffic of the UE 100 may be transmitted or received through the traffic transmission path PATH1 of the UE 100-the mobile access network AN1-the CGW 220 and the traffic transmission path PATH2 of the UE 100-the wireless local area network (WLAN) access network AN2-the CGW 220 (S300, S301, S302, and S303).

The CGW 220 may periodically or aperiodically transmit a message, i.e., AN load report for reporting a traffic load state of each of the access networks AN1 and AN2 to the eUCE 210 (S304). The AN Load Report message may include information indicating a load state of the traffic transmission paths PATH1 and PATH2 between the CGW 220 and each of the access networks AN1 and AN2, e.g., a load measurement value.

The eUCE 210 that receives the message may determine whether traffic mobility is required with respect to traffic flows served to the UE 100 based on a load state of each of the traffic transmission paths PATH1 and PATH2 included in the message (S305).

Upon determining that traffic mobility is required through operation S305, the eUCE 210 may transmit a control message SWITCH_MOD_REQ for a request of traffic mobility with respect to a traffic flow that requires traffic mobility, to the CGW 220 (S306). Accordingly, the CGW 220 may change a transmission path of the corresponding traffic flow to PATH2 from PATH1 or to PATH1 from PATH2 and may transmit a response message SWITCH_MOD_RSP corresponding thereto, to the eUCE 210 (S307).

Generally, the UE 100 may select an access network and may configure a traffic path according to a policy predetermined with a network when a traffic flow service is initiated. However, according to an exemplary embodiment of the present invention, as described above, the eUCE 210 may determine whether traffic mobility is required through operation S305 and may perform a procedure of changing a transmission path of an already served traffic flow according to the determination result (S306 and S307).

When a transmission path of a currently served traffic flow is changed through operations S305 to S307, the eUCE 210 may additionally transmit a message ROUTING_POLICY_CHANGE_REQ for a request of a dynamic change in a routing policy of the traffic flow to the UE 100 in response to the change (S308).

The UE 100 that receives the message ROUTING_POLICY_CHANGE_REQ through operation S308 may dynamically change a routing policy with respect to a currently served traffic flow through an upward path configuration of the currently served traffic flow. The UE 100 may also select access network paths (e.g., PATH1 or PATH2) according to the changed routing policy with respect to a traffic flow that is not currently served to the UE 100 when the service with respect to the corresponding traffic flow is initiated later.

The UE 100 may transmit the message ROUTING_POLICY_CHANGE_RSP to the eUCE 210 in response to the message ROUTING_POLICY_CHANGE_REQ to the eUCE 210 (S309). The message ROUTING_POLICY_CHANGE_RSP may be selectively transmitted by the UE 100 and may include information about whether a change in a routing policy with respect to a traffic flow of the UE 100 is successful/fails. For example, the message ROUTING_POLICY_CHANGE_RSP may distinguish between mobility forms of traffic flows with the routing policy being changed by the UE 100 and may be transmitted while being obviously indicated by a flag (whether traffic steering is performed, whether traffic switching is performed, or whether traffic splitting is performed).

When a transmission path is determined as any one of PATH1 and PATH2 with respect to separate traffic flows configuring user traffic of the UE 100 through operations S305 to S307, separate traffic flows configuring user traffic of the UE 100 may be transmitted or received through the corresponding traffic transmission path among the traffic transmission path PATH1 and the traffic transmission path PATH2 (S310, S311, S312, and S313).

As described above with reference to FIGS. 3 and 4, in the wireless communication system according to an exemplary embodiment, when the UE 100 multiply accesses the heterogeneous access networks AN1 and AN2, mobility between access networks of user traffic may be supported according to a load state of each of the access networks AN1 and AN2 and characteristics of each traffic flow, thereby providing an optimum traffic service to a user.

Although FIGS. 2 to 4 illustrate an example in which the UE 100 multiply accesses the LTE-based mobile access network AN1 and the WiFi-based wireless local area network (WLAN) access network AN2, this is merely an exemplary embodiment of the present invention and the present invention is not limited thereto. According to another exemplary embodiment of the present invention, an access network that the UE 100 multiply accesses may be variously modified to an access network based on a new 5G wireless transmission technology, e.g., mmWave, LTE-advanced, licensed assisted access (LAA), LTEIWi-Fi aggregation (LWA), low latency Internet of Thing (IoT) and a cellular based access network, e.g., WiMax or WiBro, or the like.

Table 3 below shows constituent elements of a 5G system environment defined in 3GPP TS 23.501.

TABLE 3

| Constituent elements of 5G system environment | |
|---|---|
| Term | Description |
| 5GC | 5G Core Network |
| 5GS | 5G System |
| 5G-AN | 5G Access Network |
| 5G-GUTI | 5G Globally Unique Temporary Identity |
| 5G-S-TMSI | 5G S-Temporary Mobile Subscriber Identity |
| 5QI | 5G QoS Indicator |
| AF | Application Function |
| AMF | Access and Mobility Management Function |
| AS | Access Stratum |
| CP | Control Plane |
| DL | Downlink |
| DN | Data Network |
| DNN | Data Network Name |
| FQDN | Fully Qualified Domain Name |
| GFBR | Guaranteed Flow Bit Rate |
| GUAMI | Globally Unique AMF ID |
| LADN | Local Area Data Network |
| MFBR | Maximum Flow Bit Rate |
| MICO | Mobile Initiated Connection Only |
| NAI | Network Access Identifier |
| NEF | Network Exposure Function |
| NF | Network Function |
| NR | New Radio |
| NRF | Network Repository Function |
| PCF | Policy Control Function |
| PEI | Permanent Equipment Identifier |
| PFDF | Packet Flow Description Function |
| QFI | QoS Flow Identity |
| QoE | Quality of Experience |
| SA NR | Standalone New Radio |
| SBA | Service Based Architecture |
| SBI | Service Based Interface5G |
| SDSF | Structured Data Storage Function |
| SMF | Session Management Function |
| SUPI | Subscriber Permanent Identifier |

TABLE 3-continued

Constituent elements of 5G system environment

| Term | Description |
| --- | --- |
| UDSF | Unstructured Data Storage Function |
| UL | Uplink |
| UL CL | Uplink Classifier |
| UPF | User Plane Function |

Table 4 below shows a reference point between functions of a 5G system defined in 3GPP TS 23.501.

TABLE 4

Reference point between functions of 5G system

| Reference point | Description |
| --- | --- |
| N1 | Reference point between the UE and the AMF. |
| N2 | Reference point between the (R)AN and the AMF. |
| N3 | Reference point between the (R)AN and the UPF. |
| N4 | Reference point between the SMF and the UPF. |
| N5 | Reference point between the PCF and an AF. |
| N6 | Reference point between the UPF and a Data Network. |
| N7 | Reference point between the SMF and the PCF. |
| N8 | Reference point between the UDM and the AMF. |
| N9 | Reference point between two Core UPFs. |
| N10 | Reference point between the UDM and the SMF. |
| N11 | Reference point between the AMF and the SMF. |
| N12 | Reference point between AMF and AUSF. |
| N13 | Reference point between the UDM and Authentication Server function the AUSF. |
| N14 | Reference point between two AMFs. |
| N15 | Reference point between the PCF and the AMF in case of non-roaming scenario, PCF in the visited network and AMF in case of roaming scenario. |
| N24 | Reference point between the PCF in the visited network and the PCF in the home network. |

Hereinafter, a method of traffic mobility in a wireless communication system according to another exemplary embodiment is described in detail with reference to Tables 3 and 4 above.

Figure 5:
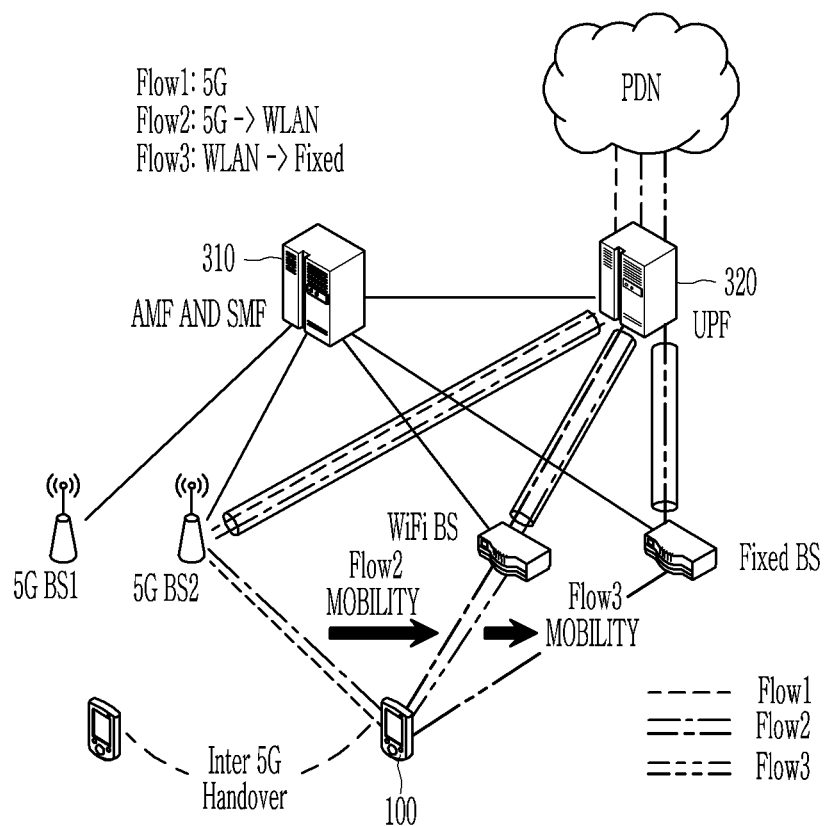
FIG. 5 is a schematic diagram of a service network of a wireless communication system according to another exemplary embodiment and illustrates an example of a 5G wireless system environment.

FIG. 5 is a schematic diagram of a service network of a wireless communication system according to another exemplary embodiment and illustrates an example of a 5G wireless system environment.

In a traffic mobility procedure in the 5G system environment, an access & mobility management function (AMF) and session management function (SMF) 310 may perform a function of the edge unified control entity (eUCE) 210 of FIG. 1 and a user plane function (UPF) 320 may perform a function of the convergence gateway (CGW) 220 of FIG. 1.

That is, whether traffic flows configuring user traffic of the UE 100 are moved in the 5G system environment may be determined by the AMF and SMF 310 based on a change in an access network that the UE 100 multiply accesses, a traffic load state of each access network, or the like. The traffic mobility procedure may be performed by exchanging a signaling procedure for changing a traffic routing policy or a rule by the UE 100, the AMF and SMF 310, and the UPF 320 that participate in the procedure.

Referring to FIG. 5, the UE 100 may multiply accesses a 5G access network, a wireless local area network (WLAN) access network, and a wired (fixed) network and may receive a traffic service from one public data network (PDN). Accordingly, the AMF and SMF 310 may determine separate or group mobility of traffic flows configuring user traffics of the UE 100 based on a change in an access network that the UE 100 multiply accesses or a load state of access networks that the UE 100 multiply accesses. In the case of group mobility of traffic flows, an entire traffic flow belonging to one data network (DN) may also be moved.

As exemplified in FIG. 5, as the AMF and SMF 310 determines a service to be maintained through a 5G access network with respect to Flow 1 among traffic flows configuring user traffic of the UE 100, Flow 1 may be continuously served through the 5G access network. On the other hand, as the AMF and SMF 310 determines mobility to a wireless local area network (WLAN) access network from a 5G access network with respect to Flow 2 and determines mobility to a wired network from the wireless local area network (WLAN) access network with respect to Flow 3, Flow 2 may be moved to the wireless local area network (WLAN) access network to serve a service and Flow 3 may be moved to a wired network to serve a service. In this case, a traffic mobility aspect may include traffic steering, traffic switching, traffic splitting, or the like.

Although FIG. 5 illustrates an example in which the UE 100 is connected to one DN and receives a service, the UE 100 may be simultaneously connected to a plurality of DNs to receive the service.

Figure 6:
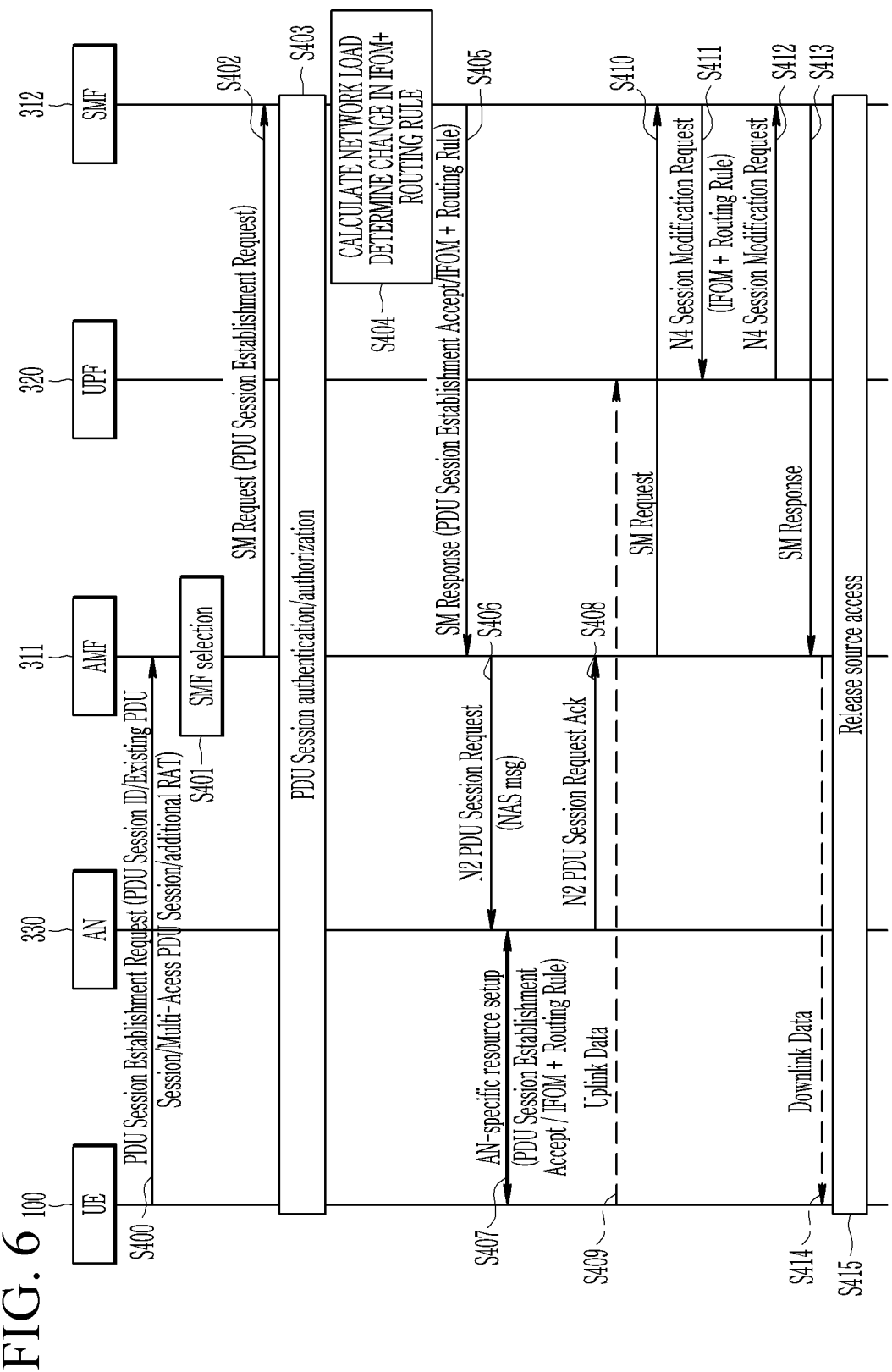
FIG. 6 illustrates an example of a signaling procedure for traffic mobility in a wireless communication system according to another exemplary embodiment.

FIG. 6 illustrates a signaling procedure for traffic mobility in a wireless communication system according to another exemplary embodiment and illustrates an example of a case in which traffic mobility is performed through a PDU session establishment procedure in the 5G system environment of FIG. 5.

In the specification, the 'PDU connectivity service' refers to a service of exchange of a protocol data unit (PDU) between a UE and a data network (DN) and the 'PDU session' refers to a correlation between a UE that provides the PDU connectivity service' and the DN. A type of the PDU session is classified into an IP, the Ethernet, or an unstructured type.

The 5G core network supports the PDU connectivity service and the PDU connectivity service may provide PDU exchange between the UE and the DN. The PDU connectivity service may be supported through configured PDU sessions from a request of the UE. When PDU sessions are established according to a request of the UE or the PDU session is modified or released according to the request of the UE or a request of the 5G core network, a non-access stratum (NAS) session management (SM) signaling procedure may be performed over an interface N1 between the UE and the SMF.

FIG. 6 illustrates the case in which the UE 100 is connected to first radio access technology (RAT) and establishes a PDU session to access a corresponding access network and, then, is connected to new RAT to access a new access network 330 in a state in which connection with legacy RAT is maintained and, in FIG. 6, a legacy PDU session is shared and used instead of establishment of an independent new PDU session from a pre-configured PDU session to access the new access network 330. In the specification, such a type in which multi-access networks are simultaneously connected to one PDU session is referred to as a multi-access PDU session.

Referring to FIG. 6, the UE 100 may transmit a PDU session establishment request message to an AMF 311 to additionally access a new access network while maintaining a state in which the UE 100 accesses a legacy access network (S400).

In operation S400, the PDU session establishment request message may include a PDU session ID, existing PDU session information, multi-access PDU session indication, a newly added RAT type, and so on. In operation S400, the PDU session establishment request message may be used for multi-access and may be configured to make a request for the multi-access PDU session.

The AMF 311 that receives the PDU session establishment request message from the UE 100 may perform SMF selection based on the message (S401).

In operation 400, the AMF 311 may extract the PDU session ID, existing PDU session information, multi-access PDU session indication, a newly added RAT type, and so on from the PDU session establishment request message and may select an SMF 312 based on the extracted information.

When the SMF 312 is selected through operation S401, the AMF 311 may transmit the SM request message, i.e., the PDU session establishment request message received from the UE 100, to the selected SMF 312 (S402).

Then, an authentication/authorization procedure may be performed on the multi-access PDU session requested by the UE 100 and whether the PDU session establishment requested by the UE 100 is authorized may be determined (S403).

When the authentication/authorization procedure on the PDU session requested by the UE 100 is successfully completed, the SMF 312 may transmit the SM Response message, that is, a PDU session establishment accept message to the AMF 311 (S405).

Prior to transmission of the PDU session establishment accept message, the SMF 312 may calculate a load state of a corresponding DN and may determine whether mobility of a traffic flow is required, that is, whether an Internet protocol flow mobility (IFOM) and routing rule needs to be updated, based on the calculated load state (S404).

In operation S404, upon determining that the IFOM and routing rule needs to be updated, the SMF 312 may perform IFOM update trigger and may update the IFOM and routing rule. The updated IFOM and routing rule may be included in the PDU session establishment accept message (S405) that is a response message to PDU session establishment and may be transmitted.

Then, the PDU session establishment accept message including the updated IFOM and routing rule may be transferred to the UE 100 through an N2 PDU session request message (S406) transferred to a BS of the access network 330 from the AMF 311 and an AN-specific resource setup procedure (S407) between the access network 330 and the UE 100.

The UE 100 that receives the updated IFOM and routing rule may apply the updated IFOM and routing rule to traffic transmission and reception of the UE 100. That is, the UE 100 may dynamically change a routing policy with respect to a currently served traffic flow via an upward path configuration of the currently served traffic flow. The UE 100 may also select access network paths (e.g., PATH1 or PATH2) according to the updated routing policy with respect to a traffic flow that is not currently served to the UE 100 when the service with respect to the corresponding traffic flow is initiated later.

The BS of the access network 330, which receives an N2 PDU session request message from the AMF 311, may transmit a response message (N2 PDU session request ACK) to the AMF 311 in response to the message.

Then, as the UE 100 transmits uplink user data to a DN, that is, a UPF 320 (S409), the SMF 312 may verify that the PDU session establishment accept message is successfully transferred to the UE 100 through the SM request message (including N2 information) (S410) transmitted to the SMF 312 from the AMF 311 and an N4 session modification procedures (S411 and S412).

As the SMF 312 receives the SM request message from the AMF 311, the SMF 312 may include the updated IFOM and routing rule in an N4 session modification request message and may transmit the message to the UPF 320 (S411). The UPF 320 that receives the message may apply the message and may perform an N4 session modification procedure. That is, based on the updated IFOM and routing rule, a change procedure of the traffic transmission path may be performed. The N4 session modification response message may be transmitted to the SMF 312 in response to the N4 session modification request message (S412). The SMF 312 that receives the message may transfer an SM response message to the AMF 311 in response to the SM request message received in operation S410 (S413).

Downlink user data (traffic flow) that is generated later may be transmitted to the UE 100 from a DN (the UPF 320) according the newly changed IFOM and routing rule (S414).

As described above, traffic flows between the UE 100 and a DN may be distributed, re-arranged, and moved in a plurality of access networks that the UE 100 accesses through the PDU session establishment procedure.

In operation S404 of FIG. 6, the procedure of calculating the load state of an access network and changing the IFOM and routing rule may correspond to the aforementioned operation S213 of FIG. 3. That is, in operation S404, the SMF 312 may perform the function of the eUCE 210 in operation S213, that is, a function of determining whether traffic mobility is required with respect to each traffic flow, based on a mobility policy of each traffic flow served to the UE 100 and a transmission state of each access network that the UE 100 accesses.

Generally, a UE may select an access network and may configure a traffic path according to a policy predetermined with a network when a traffic flow service is initiated. However, according to an exemplary embodiment of the present invention described with reference to FIG. 6, as described above, the SMF 312 may determine whether traffic mobility is required depending on a load state of the DN and may perform operations S411 and S412 of changing a transmission path of an already served traffic flow according to the determination result.

Figure 7:
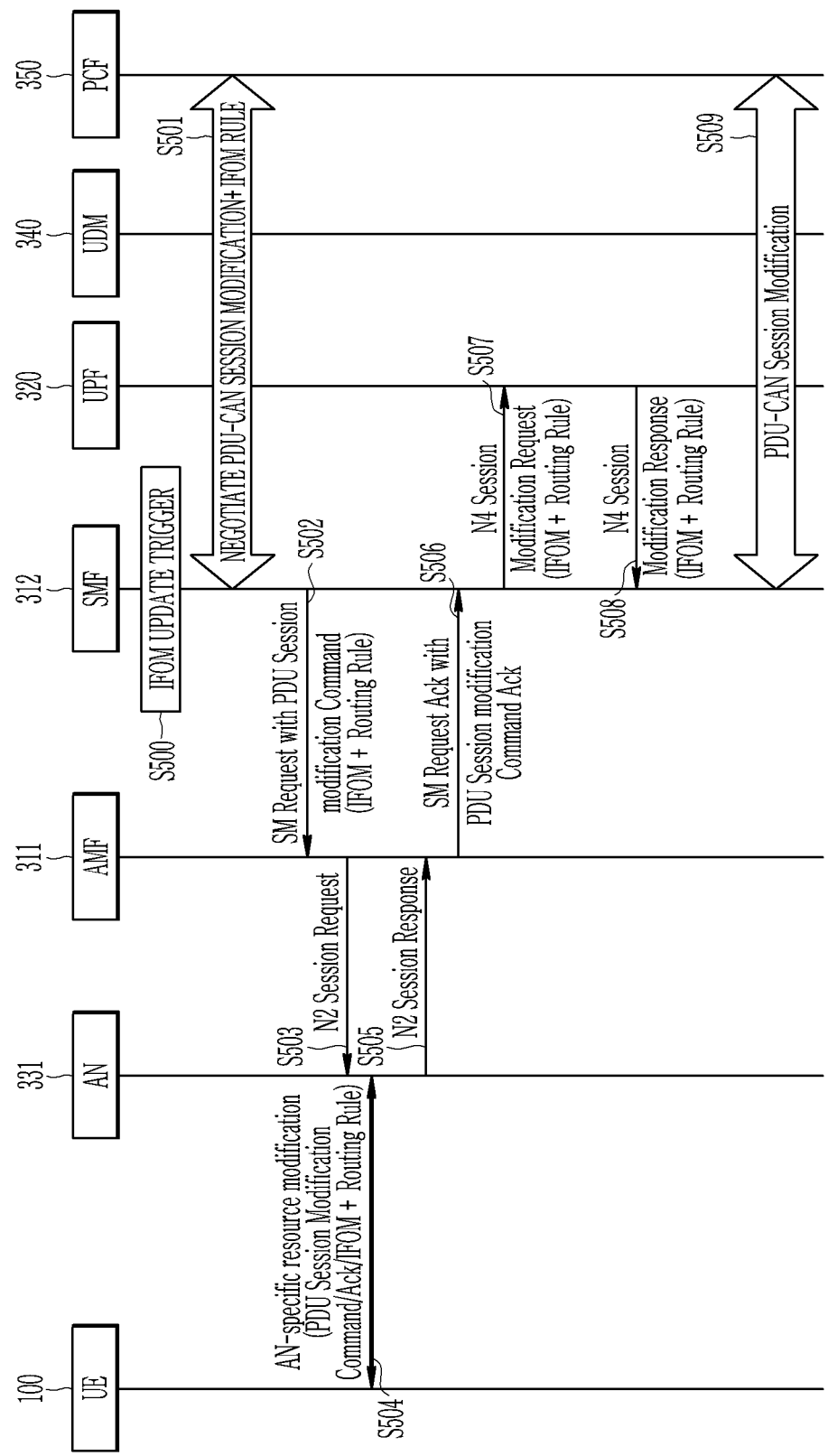
FIG. 7 illustrates an example of a signaling procedure for traffic mobility in a wireless communication system according to yet another exemplary embodiment.

FIG. 7 is a schematic diagram of a signaling procedure for traffic mobility in a wireless communication system according to yet another exemplary embodiment and illustrates an example of the case in which a traffic mobility and dynamic path change is determined to be required through a 5G core network and traffic mobility is performed via a PDU session modification procedure in the 5G system environment of FIG. 5.

Referring to FIG. 7, as a SMF 312 determines that the IFOM and routing rule needs to be updated and performs IFOM update trigger (S500), the PDU session modification procedure for mobility of a traffic flow may be initiated.

In operation S500, the SMF 312 may determine whether the IFOM and routing rule needs to be updated based on an access state of the UE 100 with respect to a multi-access network, a load state of each access network, whether QoS of each traffic flow is guaranteed, and so on.

Upon determining that the IFOM and routing rule needs to be updated, the SMF 312 may generate a new IFOM and routing rule. Whether a current network (the UPF 320, a UDM 340, and a policy control function (PCF) 350) and a newly generated rule are applicable to an environment of the current network and an environment of the UE 100 may be negotiated through a PDU-connectivity access network (CAN) session modification procedure (S501).

When the negotiation is completed, the SMF 312 may generate a PDU session modification command including the newly updated IFOM and routing rule and may include the command in the SM request message and may transmit the message to an AMF 311 (S502). Then, the PDU session modification command may be transferred to the UE 100 through an N2 session request message (S503) transmitted to a BS of an access network 331 from the AMF 311 and an AN-specific resource setup procedure (S504) between the BS of the access network 330 and the UE 100.

Upon receiving the PDU session modification command, the UE 100 may apply the IFOM and routing rule included in the PDU session modification command to traffic transmission and reception of the UE 100. That is, the UE 100 may dynamically change a routing policy with respect to a currently served traffic flow via an upward path configuration of the currently served traffic flow. The UE 100 may also select access network paths (e.g., PATH1 or PATH2) according to the updated routing policy with respect to a traffic flow that is not currently served to the UE 100 when the service with respect to the corresponding traffic flow is initiated later.

When the IFOM and routing rule is completely applied, the UE 100 may transfer a PDU session modification command ACK message to the access network 330 through the AN-specific resource setup procedure between the BS of the access network 330 and the UE 100. Then, the PDU session modification command ACK message may be transferred to the SMF 312 through an N2 Session Response message (S505) transferred to the AMF 311 in the access network 330 and a SM request ACK message (S506) transferred to the SMF 312 from the AMF 311.

Then, the SMF 312 may change the user traffic mobility and routing rule through an N4 session modification procedure (S507 and S508).

As the SMF 312 receives the SM request ACK message from the AMF 311, the SMF 312 may include the updated IFOM and routing rule in the N4 session modification request message and may transfer the message to the UPF 320 (S507). The UPF 320 that receives the message may apply the message and may perform the N4 session modification procedure. That is, based on the updated IFOM and routing rule, a change procedure on a user data (traffic flow) transmission path may be performed. An N4 session modification response message may be transmitted to the SMF 312 in response to the N4 session modification request message (S508).

Then, as necessary, the SMF 312 may change the IFOM and routing rule according to the multi-access PDU session modification procedure and may perform PDU-CAN session modification on all entities including the PCF 350 that is affected by the IFOM and routing rule (S509).

Accordingly, downlink user data (traffic flows) that are generated later may be transmitted to the UE 100 according to the newly updated IFOM and routing rule.

Figure 8:
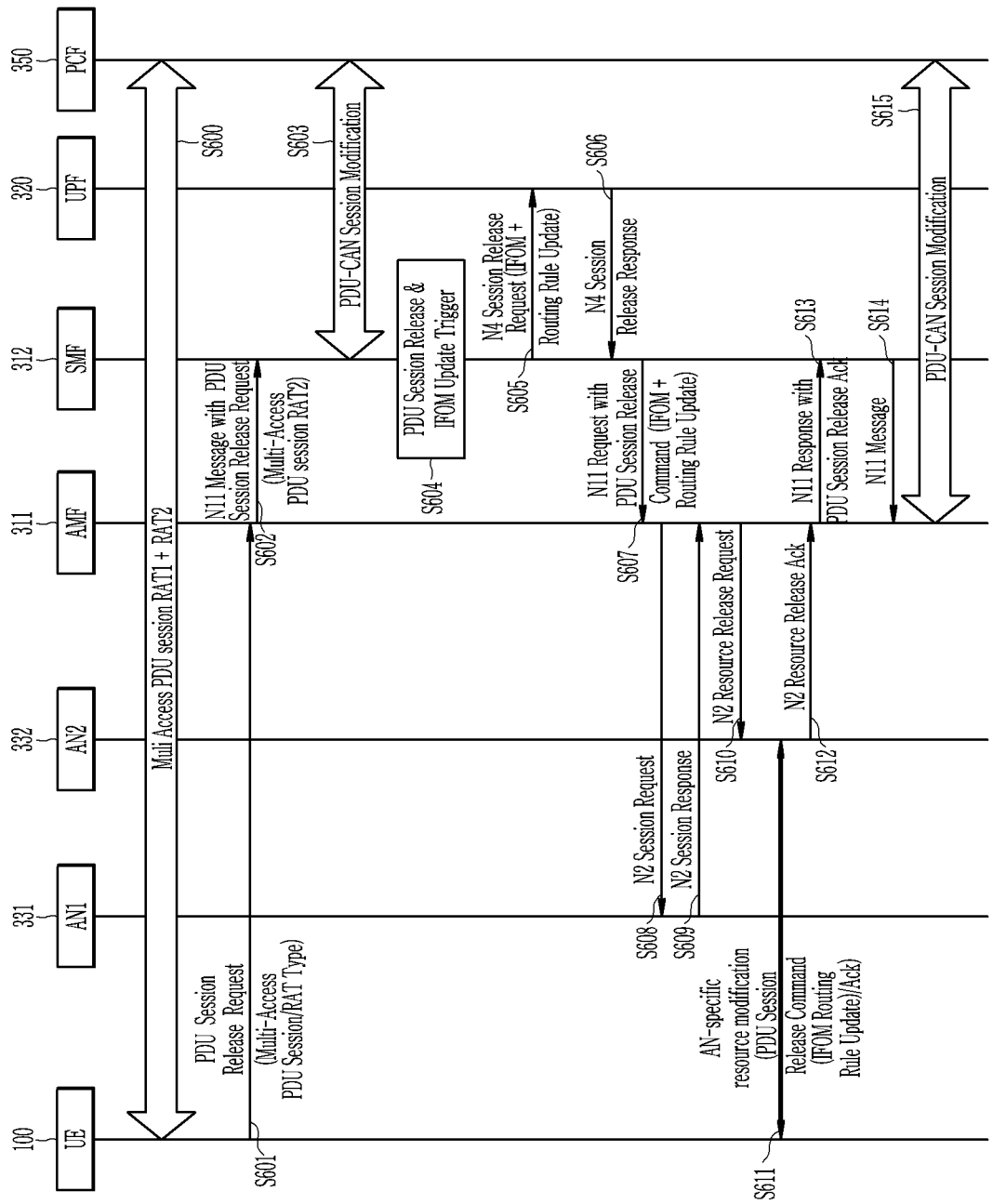
FIG. 8 illustrates an example of a signaling procedure for traffic mobility in a wireless communication system according to yet another exemplary embodiment.

FIG. 8 illustrates a signaling procedure for traffic mobility in a wireless communication system according to yet another exemplary embodiment. FIG. 8 illustrates an example of the case in which traffic mobility is performed through a PDU session release procedure to move currently served traffics from an access network to be released to another access network that is not released as one access is released in a PDU session in a multi-access state in a 5G system environment.

In a multi-access PDU session in which one UE 100 accesses two or more multiple RATs and multi-access networks are shared and managed by a single PDU session, a PDU session release procedure may also be used when one of the RATs managed by the PDU session is released.

According to the PDU session release procedure, all resources associated with a corresponding PDU session may be released. To this end, the SMF 312 needs to notify all entities related to a PDU session as a release target, for example, the PCF 350, a DN, or the like about release of the PDU session.

The PDU session release procedure may be initiated by the UE 100 or a DN. When one access is released in a multi-access environment, the PDU session release procedure may be used and a specific access network may be determined and released through the PDU session release procedure.

Referring to FIG. 8, a current state is a state (S600) in which the UE 100 multiply accesses the two RATs RAT1 and RAT2 and the networks 331 and 332 that the UE 100 multiply accesses are shared and managed in one multi-access PDU session. Here, RAT1 may correspond to the first access network AN1 331 and RAT2 may correspond to the second access network AN2 332.

In this state, when the UE 100 intends to release access to any one RAT RAT2, the RAT type RAT2 to be released in the multi-access PDU session may be transferred to the AMF 311 while being obviously indicated in a PDU session release request message (S601). Accordingly, the AMF 311 may transfer an N11 message including the received PDU session release request to the SMF 312 that manages the PDU session to be released (S602).

During the release procedure of the RAT2 from which access of the UE 100 is to be released, the SMF 312 that receives the message may perform a PDU-CAN session modification procedure to move traffic served in the RAT2 to the other RAT RAT1 that is not released instead of termination of the traffic served in the RAT2, according to the IFOM policy (S603).

As the SMF 312 generates a new IFOM and routing rule through the PDU-CAN session modification procedure, the SMF 312 may change the IFOM and routing rule through an IFOM update trigger (S604) and may transfer an N4 session release resource message including the updated IFOM and routing rule to the UPF 320 (S605)

The UPF 320 that receives the message may perform a procedure required to release the RAT2 requested to be released and may configure a new IFOM and routing rule to move traffics served in the RAT2 to the other RAT RAT1 instead of termination of the served traffic. An N4 session release response message may be transferred to the SMF 312 (S606).

Then, to transfer the IFOM and routing rule updated along with release of the RAT2 to the UE 100, the SMF 312 may configure a PDU session release command message including the updated IFOM and routing rule and may transmit the N11 request message including the PDU session release command message to the AMF 311 (S607).

Accordingly, the AMF 311 may transmit and receive an N2 Session Request message (S608) and an N2 session response message (S609) and may perform a procedure required to change a path according to traffic mobility on the access network 331 from which access is not released. As access to the RAT2 is released, an N2 resource release request message may be transmitted to the BS of the second access network 332 to make a request for release of a resource allocated to the UE 100 (S610).

Accordingly, the BS of the second access network 332 may release a resource corresponding to the second access network 332. The BS of the second access network 332 may perform an AN-specific resource setup procedure with the UE 100 (S611) and may notify the UE 100 about the updated IFOM and routing rule and completion of resource release. That is, the base station of the second access network 332 may transfer a PDU session release command including information (ACK) indicating the updated IFOM and routing rule and completion of resource release through the AN-specific resource setup procedure, to the UE 100.

Upon receiving the PDU session release command, the UE 100 may apply the IFOM and routing rule included in the PDU session release command to transmission and reception of traffic of the UE 100. That is, the UE 100 may dynamically change a routing policy with respect to a currently served traffic flow through an upward path configuration of the currently served traffic flow. The UE 100 may also select access network paths according to the updated routing policy with respect to a traffic flow that is not currently served to the UE 100 when the service with respect to the corresponding traffic flow is initiated later.

As resource release is completed, the BS of the second access network 332 may transfer an N2 resource release ACK message to the AMF 311 to notify the AMF 311 about completion of resource release (S612).

The AMF 311 that receives the message may transfer an N11 response message including ACK including information indicating whether PDU session release is successful, to the SMF 312 (S613) and the SMF 312 may transfer an N11 message to the AMF 311 in response to the N11 response message (S614).

As necessary, the SMF 312 may change the IFOM and routing rule using a multi-access PDU session release procedure and may perform PDU-CAN session modification on all entities including the PCF 350, which are affected by the change (S615).

As the PDU session release procedure is completed through the aforementioned procedure, downlink user data (traffic flows) that are generated later may be transmitted to the UE 100 according to the newly updated IFOM and routing rule.

According to an exemplary embodiment of the present invention, when a UE may simultaneously access a plurality of access networks to transmit and receive traffic in an environment in which heterogeneous wireless access networks coexist, traffic mobility between the access networks may be supported.

Exemplary embodiments of the present invention may be embodied through a program recorded on a recording medium or a recording medium with the program recorded thereon as well as through the aforementioned apparatus and/or method to implement a function corresponding to the configurations of the exemplary embodiments of the present invention and the implementation may be easily achieved by one of ordinary skill in the art to which the present invention pertains from the above description of the exemplary embodiments.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of traffic mobility between heterogeneous access networks of a wireless communication system, the method comprising:
   as a user equipment (UE) that accesses a first access network attempts multi-access to a second access network, by a session management function (SMF), determining whether a preconfigured first Internet protocol flow mobility (IFOM) and routing rule needs to be updated, based on a traffic mobility policy of each traffic flow served to the UE and a transmission state of the second access network, wherein the traffic mobility policy includes access network preference of the each traffic flow or whether quality of service (QoS) of the each traffic flow is guaranteed, and the transmission state of the second access network includes a load state of the second access network;
   upon determining that the first IFOM and routing rule needs to be updated, by the SMF, changing the first IFOM and routing rule to a second IFOM and routing rule; and
   by the SMF, transmitting the second IFOM and routing rule to an access & mobility management function (AMF) to provide the second IFOM and routing rule to the UE.

2. The method of claim 1, further comprising:
   by the SMF, receiving a PDU session establishment request message of a multi-access PDU session shared by the first and second access networks from the UE; and
   when the multi-access PDU session is completely authorized, by the SMF, transmitting a response to the PDU session establishment request message, to the AMF,
   wherein the response includes the second IFOM and routing rule.

3. The method of claim 2, wherein when the second IFOM and routing rule is applied to the UE, the UE configures an uplink path of currently served traffic flows or traffic flows to be served later according to the second IFOM and routing rule.

4. The method of claim 1, wherein:
   upon determining that the first IFOM and routing rule needs to be updated, by the SMF, the changing the first IFOM and routing rule to the second IFOM and routing rule comprises:
   by the SMF, generating the second IFOM and routing rule;
   by the SMF, through a PDU-connectivity access network (CAN) session modification procedure, negotiating whether a current network and the second routing rule are applicable to an environment of the current network and an environment of the UE; and
   when the negotiation is completed, by the SMF, changing the first IFOM and routing rule to the second IFOM and routing rule.

5. The method of claim 4, wherein:
   by the SMF, the transmitting the second IFOM and routing rule to the AMF comprises:
   by the SMF, transmitting a PDU Session Modification Command to the AMF,
   wherein the PDU Session Modification Command includes the second IFOM and routing rule.

6. The method of claim 1, further comprising:
   as the UE makes a request for access release from the second access network, by the SMF, transmitting a newly configured third IFOM and routing rule through a PDU-CAN session modification procedure to the AMF.

7. The method of claim 6, wherein:
by the SMF, the transmitting a newly configured third IFOM and routing rule through a PDU-CAN session modification procedure to the AMF comprises:
by the SMF, transmitting a PDU Session Release Command to the AMF,
wherein the PDU Session Release Command includes the third IFOM and routing rule.

8. The method of claim 7, wherein when the third IFOM and routing rule is applied to the UE, the UE configures an uplink path of currently served traffic flows or traffic flows to be served later according to the third IFOM and routing rule.

\* \* \* \* \*